Oct. 8, 1940.                    C. OTTO                    2,216,983
                          UNDERFIRED COKE OVEN
                          Filed June 6, 1938                 7 Sheets-Sheet 2
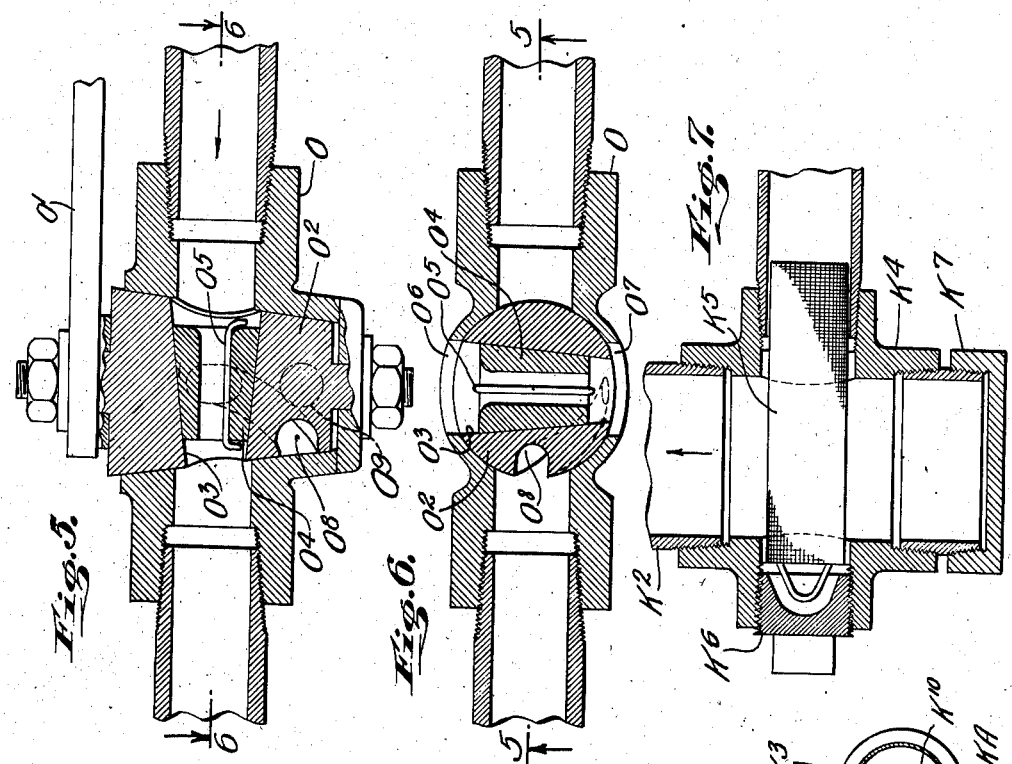
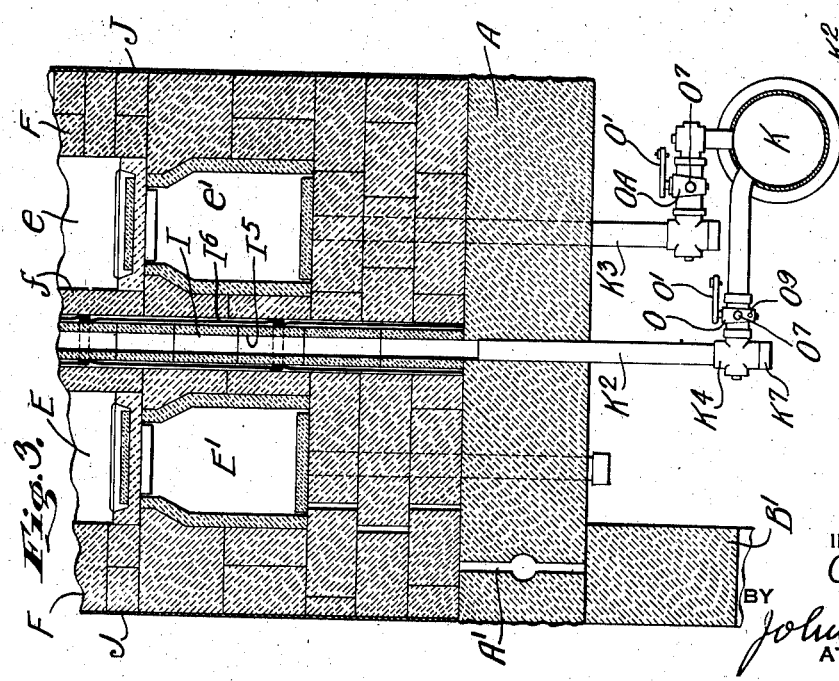
INVENTOR
CARL OTTO
BY
John E. Hubbell
ATTORNEY

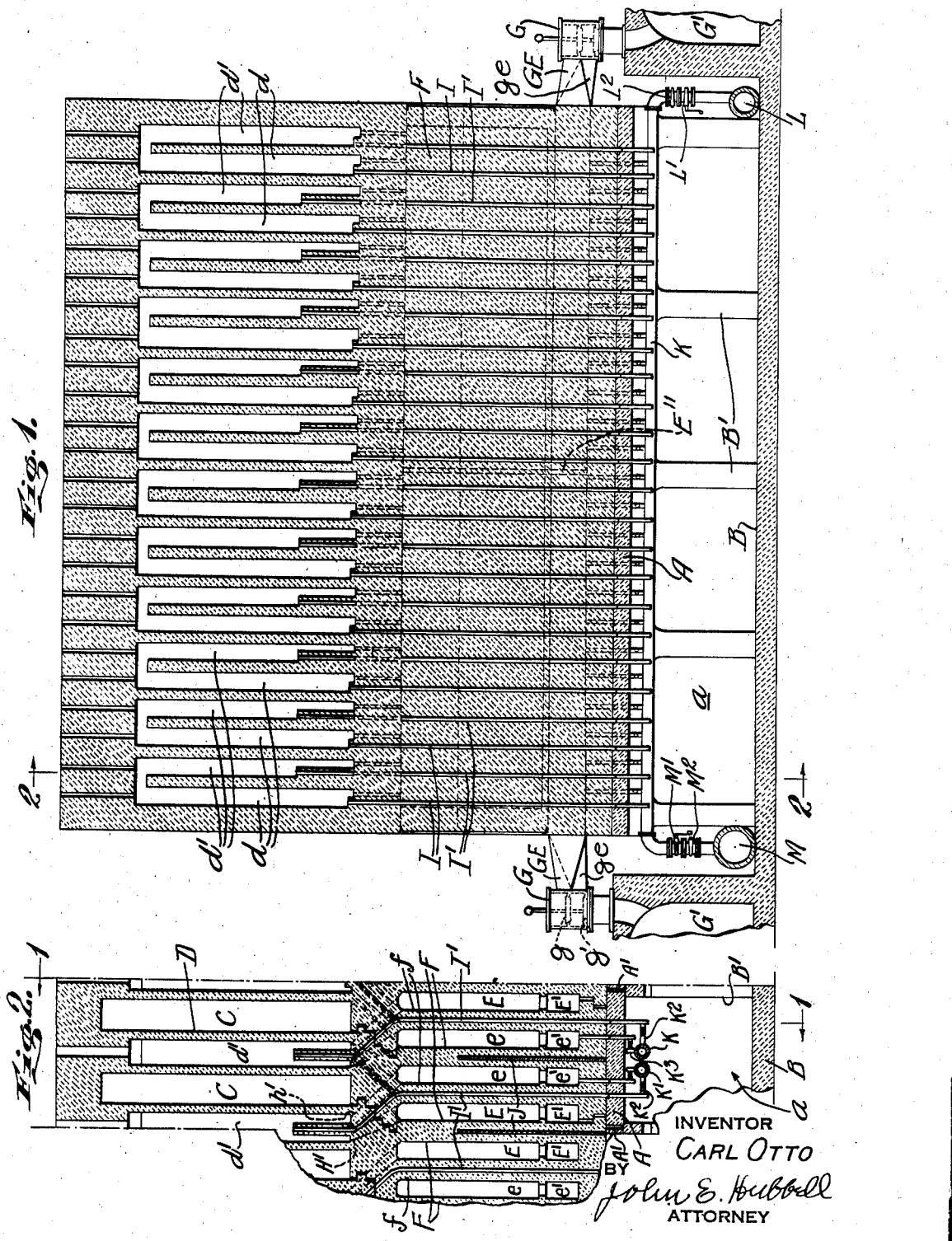

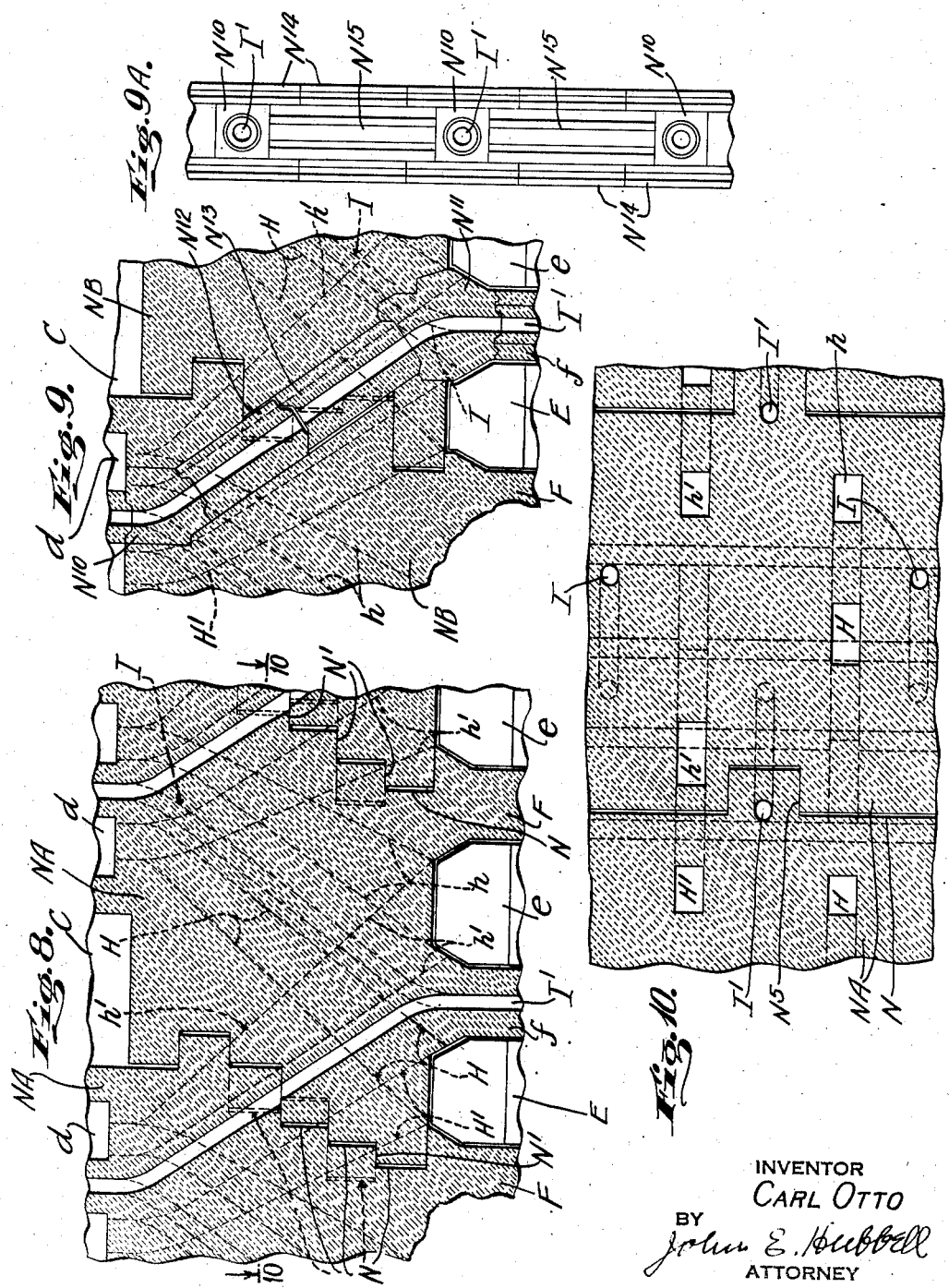

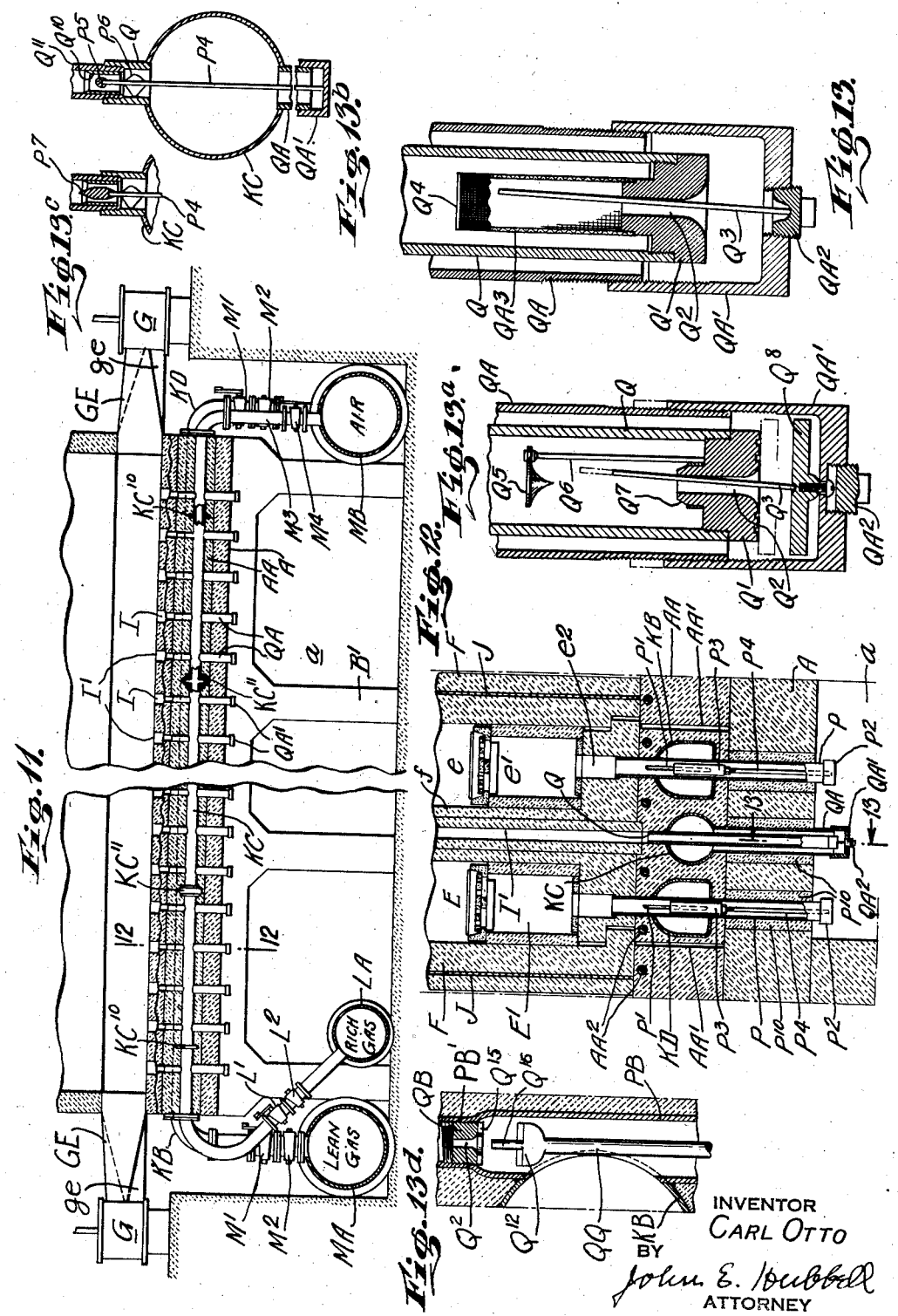

Oct. 8, 1940.  C. OTTO  2,216,983
UNDERFIRED COKE OVEN
Filed June 6, 1938   7 Sheets-Sheet 5
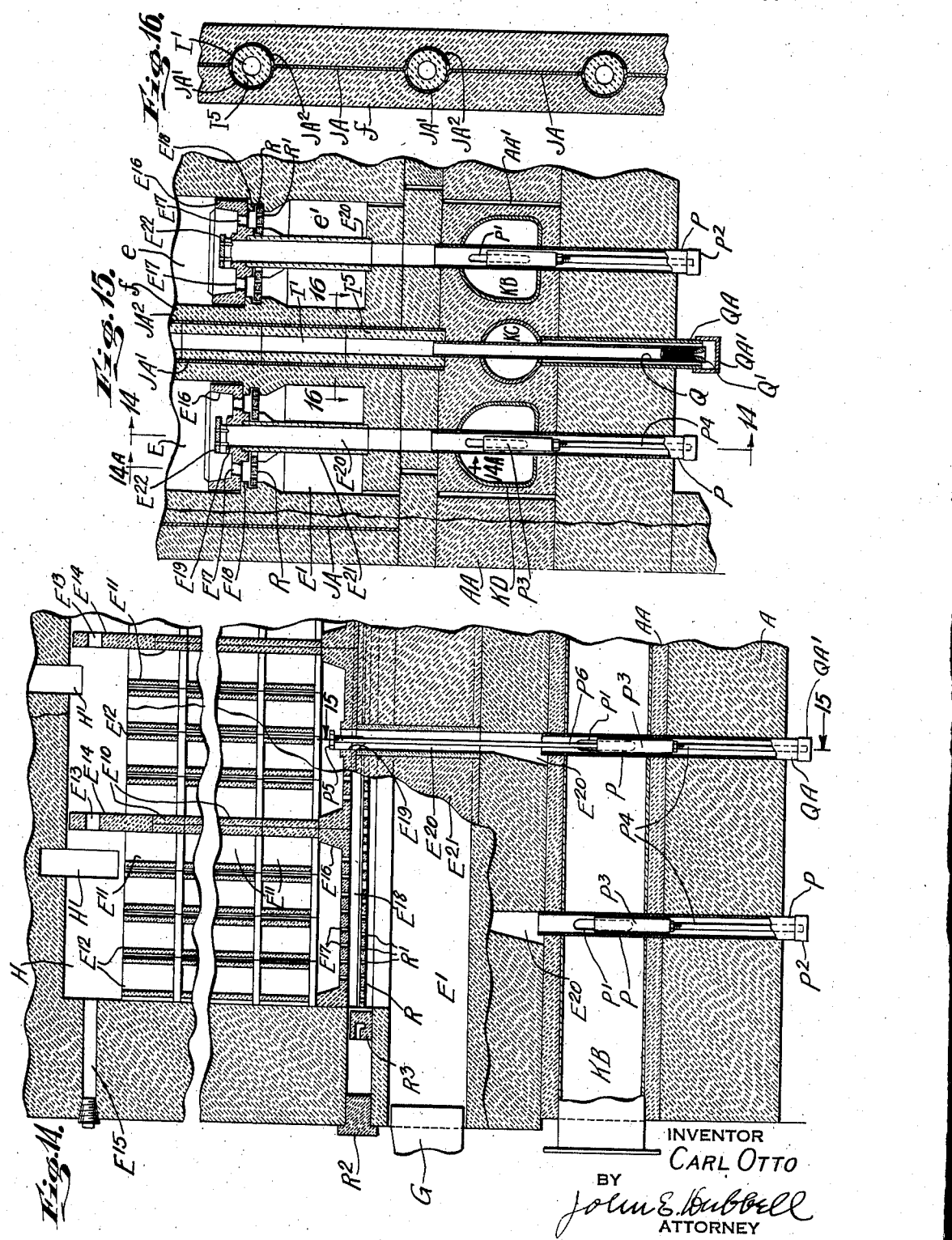
INVENTOR
CARL OTTO
BY
John E. Hubbell
ATTORNEY Oct. 8, 1940.  C. OTTO  2,216,983
UNDERFIRED COKE OVEN
Filed June 6, 1938  7 Sheets-Sheet 6
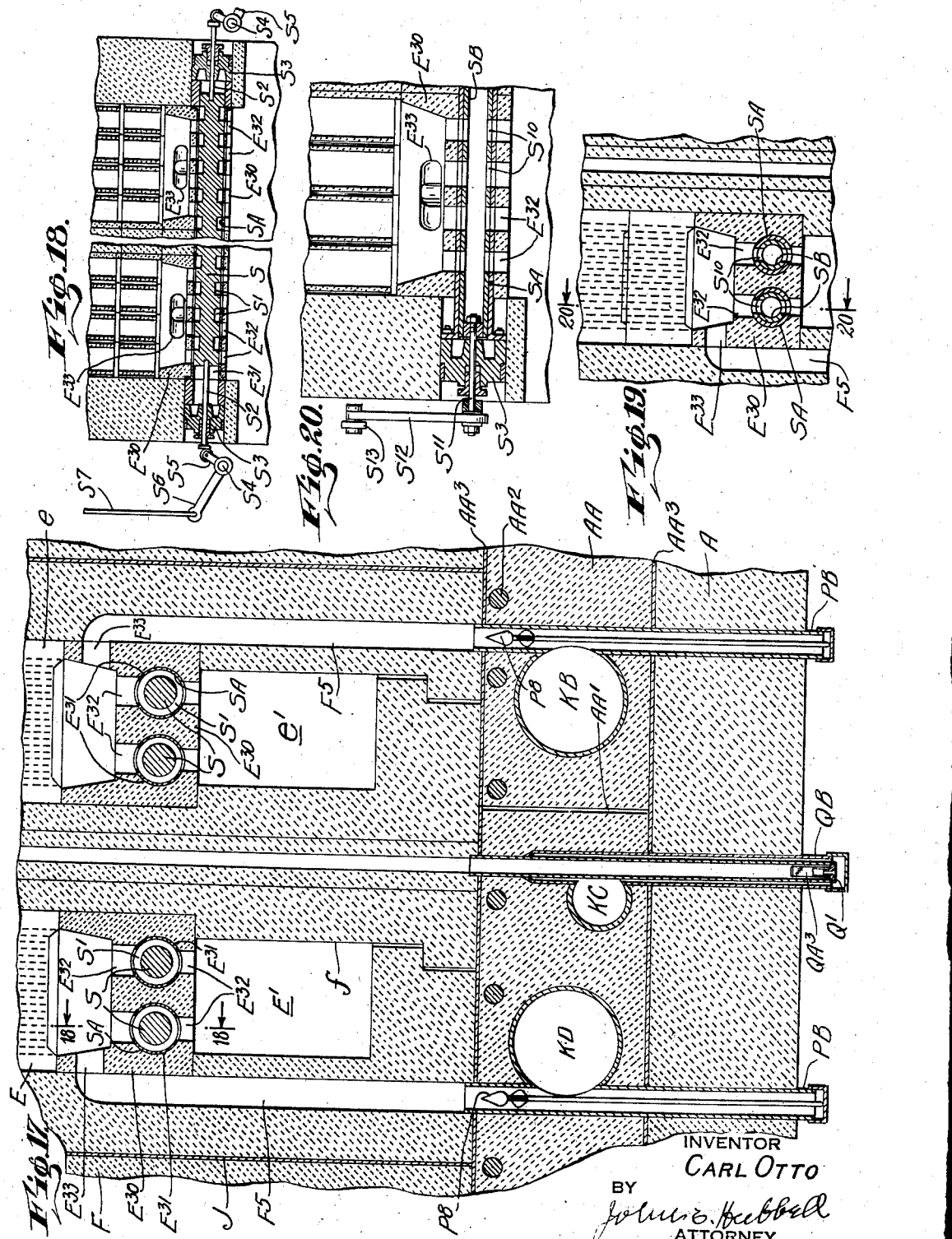

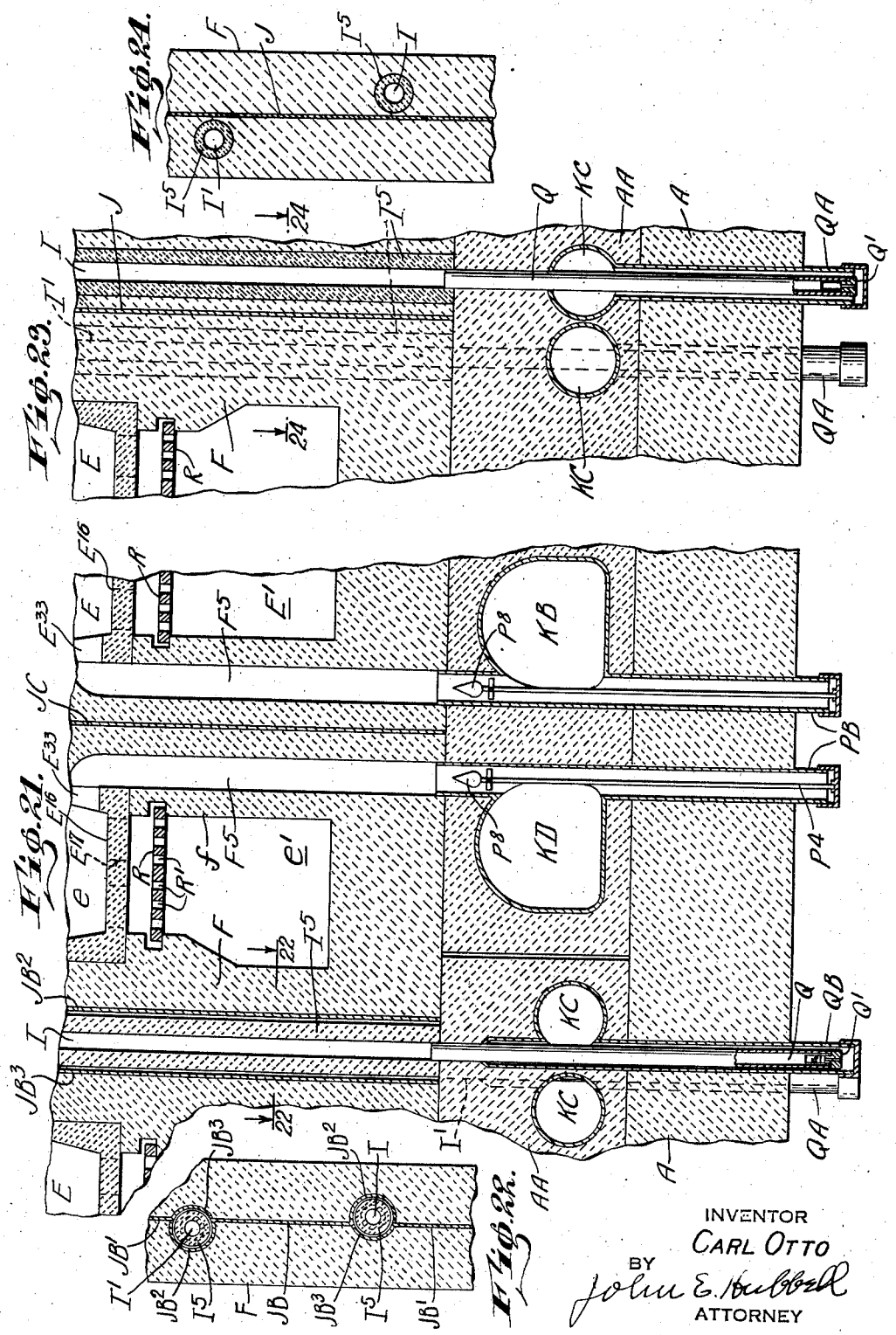

Patented Oct. 8, 1940

REISSUED
OCT 28 1941

2,216,983

UNITED STATES PATENT OFFICE 2,216,983

UNDERFIRED COKE OVEN

Carl Otto, The Hague, Netherlands, assignor to Fuel Refining Corporation, Dover, Del., a corporation of Delaware Application June 6, 1938, Serial No. 212,084
In Germany October 16, 1937

25 Claims. (Cl. 202—142)

The general object of the present invention is to improve the regenerative, and the fuel and air supply provisions of horizontal underfired regenerative coke oven batteries, and particularly of such batteries having hairpin flues in their heating walls, and adapted for operation optionally with a lean fuel gas which is, or with a rich fuel gas which is not, regeneratively preheated.

A primary object of the invention is to provide an underfired coke oven having hairpin heating flues with but two side by side regenerators between the pillar walls respectively beneath each two adjacent heating walls, and with means substantially eliminating the risk of objectionable leakage of fuel gas into "off" regenerators through the side walls of such regenerators, which heretofore has made it customary to provide a set of three side by side regenerators between adjacent pillar walls and to preheat lean fuel gas in the central one of the three regenerators, while preheating combustion air in the two side regenerators of the set. The use of two, instead of three, regenerators between each two pillar walls, simplifies the structure, and reduces the construction cost of the battery, and by increasing the width of the individual regenerators, facilitates regenerator repairs, but requires that a waste heat or "off" regenerator be immediately alongside each gas preheating regenerator.

To suitably minimize leakage through each wall between adjacent gas heating and waste heat regenerators, as a result of the difference between the pressures in the two regenerators, I reduce the perviousness, so to speak, of each such wall in one or both of two ways. One of said ways comprises the transfer of the vertical rich fuel gas supply channel from their customary location in the pillar walls, to the regenerator division walls intermediate the pillar walls. The second of said ways comprises the incorporation of a longitudinal, metal plate, leakage barrier in each such wall, extending upward from the regenerator bottom level for a considerable distance. The leakage barrier may be in the form of a single plate extending for the full length of the pillar wall, or it may be formed in sections. In some cases such a barrier is advantageously incorporated in regenerator division walls other than those immediately adjacent regenerators used in preheating gas. When incorporated in a regenerator division wall including vertical gas supply channels, the barrier may advantageously be formed or disposed to reduce the risk of gas leakage from said channels.

A more specific object of the invention is to provide improved means for supplying combustion air and lean fuel gas to regenerators of such a battery for preheating therein, in amounts suitably distributed and proportioned along the lengths of the regenerators.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention;

Of the drawings:

Fig. 1 is a vertical transverse section of an underfired coke oven battery, the section being taken on the broken line 1—1 of Fig. 2;

Fig. 2 is a partial vertical section taken on the line 2—2 of Fig. 1;

Fig. 3 is a partial section taken similarly to Fig. 2, but on a larger scale and illustrating details of construction not shown in Fig. 2;

Fig. 4 is a section illustrating a modification of the fuel gas piping shown in Fig. 3;

Fig. 5 is a sectional elevation of the rich fuel gas supply valves shown in Fig. 3, the section being taken on the line 5—5 of Fig. 6;

Fig. 6 is a horizontal section on the line 6—6 of Fig. 5;

Fig. 7 is a partial vertical section through the parts shown in Fig. 3;

Fig. 8 is a vertical section taken similarly to Fig. 2, but on a larger scale, of a portion of the oven brickwork between the oven floor level and the tops of the regenerator chambers;

Fig. 9 is a view taken similarly to Fig. 8, illustrating a modified brickwork arrangement;

Fig. 9A is a top view of brickwork parts employed in the arrangement shown in Fig. 9;

Fig. 10 is a partial horizontal section on the line 10—10 of Fig. 8;

Fig. 11 is a partial section taken similarly to Fig. 1, illustrating a modified form of gas and air supply means;

Fig. 12 is a partial vertical section on the line 12—12 of Fig. 11;

Fig. 13 is a partial section on the line 13—13 of Fig. 12;

Figs. 13a, 13b, 13c and 13d are partial sections taken similarly to Fig. 13, and each illustrating a different modification;

Fig. 14 is a fragmentary vertical section taken transversely of a battery having a modified regenerator and regenerator division wall arrangement, the section being taken on the line 14—14 of Fig. 15 except for its upper left hand portion, which is taken on the line 14A—14 of Fig. 15;

Fig. 15 is a partial vertical section on the line 15—15 of Fig. 14;

Fig. 16 is a partial horizontal section on the line 16—16 of Fig. 15;

Fig. 17 is a partial vertical section taken similarly to, and illustrating a modification of the construction shown in Figs. 14 and 15;

Fig. 18 is a partial section on the line 18—18 of Fig. 17;

Fig. 19 is a vertical section, illustrating a modified form of part of the apparatus shown in Figs. 17 and 18;

Fig. 20 is a section on the line 20—20 of Fig. 19;

Fig. 21 is a partial vertical section taken longitudinally of a coke oven battery having rich fuel gas supply ducts located in specially formed regenerator division walls directly beneath the heating walls;

Fig. 22 is a partial horizontal section on the line 22—22 of Fig. 21;

Fig. 23 is a partial vertical section taken similarly to, and illustrating a modification of the construction shown in Fig. 21; and Fig. 24 is a horizontal section on the line 24—24 of Fig. 23.

Figs. 1 and 2 illustrate a regenerative underfired horizontal coke oven battery, comprising a brickwork block or mass supported on a deck member A. The latter is customarily in the form of a slab of reinforced concrete, and, as shown, is divided into sections, by expansion joints $A'$, the said joints extending transversely of the battery. The deck is supported on columns or pillars $B'$, carried by and rising from the battery foundation B, which is separated from the deck A, by a basement space $a$.

The brickwork block or mass supported on the deck A, comprises upper and lower stories. The upper story includes horizontally elongated coking chambers C, alternating with heating walls D. Each of the latter includes vertical flues, connected at their upper ends in groups, and separately connected at their lower ends to regenerators and rich fuel gas supply ducts, for simultaneous up or down flow through one or more flues, and for down and up flow, respectively, through one or more other flues, of each group. As shown, each group is of the most usual hairpin flue type having each of its two branches $d$ and $d'$ formed by a single vertical flue. The lower story comprises two side by side regenerator chambers E and $e$, between each two adjacent pillar walls F, there being one pillar wall F directly beneath each heating wall D. Midway between each two adjacent pillar walls F, and interposed between the corresponding regenerators E and $e$, is an intermediate regenerator division wall $f$.

The regenerators E and $e$ have sole channels $E'$ and $e'$ through which waste heating gases may pass from the regenerators to corresponding reversing valves G connecting the ends of the sole channels to a waste heat tunnel $G'$ at one or each side of the battery. With a tunnel $G'$ at each side of the battery, the regenerators and sole channels $E'$ and $e'$, may each be divided into two aligned sections, by a central vertical, longitudinal partition $E''$. As shown, each valve G serves for the simultaneous discharge of waste heat gases from two adjacent sole channels $E'$ and $e'$, respectively connected by conduits GE and $ge$ to upper and lower inlet chambers of the valve by said chambers having bottom outlets controlled by separate valve disc parts $g$ and $g'$ of the movable valve member conduits GE and $ge$. When lean fuel gas is being preheated in a regenerator $e$, there will be no significant leakage of gas past the corresponding valve disc $g$, even though the latter does not fit snugly against its seat, because of the substantial equality of the pressures above and below said disc.

The coke oven battery shown in Figs. 1 and 2, is a so-called "combination oven" battery, adapted for operation either with a rich fuel gas which is not regeneratively preheated, or with a lean fuel gas which needs to be regeneratively preheated. In operation with rich fuel gas, all of the regenerators E and $e$ are used in preheating combustion air, and in this case, each valve G may serve to place the end of the sole channel $E'$ or $e'$, to which it is connected, alternately in communication with the adjacent waste heat tunnel $G'$ for the discharge of waste heating gases, and in communication with the adjacent waste heat tunnel $G'$ for the discharge of waste heating gases, and in communication with the atmosphere for the inflow of the sole channel of atmospheric air. In operation, with lean fuel gas, the regenerators E are used in preheating combustion air as in rich gas operation, but the regenerators $e$ are used in preheating the lean fuel gas. When the regenerators $e$ are used in preheating lean fuel gas, the valves G associated with those regenerators $e$, must be arranged so that they at no time connect the corresponding sole channels $e'$ to the atmosphere, and means must be provided for supplying to the regenerators $e$, the fuel gas to be preheated therein.

Each of the regenerators E and $e$, alternately receives products of combustion from, and supplies preheated air or lean fuel gas to one set of twin flue branches $d$ or $d'$ in each of the two heating walls above the pillar walls F at the opposite sides of the regenerator. As those skilled in the art will understand, during reversal periods in which fuel gas is being supplied to one set of branches, for example, the branches $d$, of the twin flues in one heating wall, fuel gas may also be supplied either to the branches $d$ or to the branches $d'$ in each of the two immediately adjacent heating walls. In the arrangement shown, fuel gas is supplied at any one time to the flue branches $d$, in every second heating wall and to the branches $d'$ in the remaining heating walls.

All of the forms of the invention illustrated herein are alike in having regenerator and heating flue connections H, $H'$, $h$ and $h'$ of the general type shown best in Figs. 8 and 9. Each regenerator E is connected by an inclined duct or passage H to one branch, $d$ or $d'$, of each hairpin flue in the heating wall D above the pillar wall F at the right of said regenerator, and is connected by an inclined duct or passage $H'$, to each corresponding hairpin flue branch $d'$ or $d$, respectively, in the heating wall D above the pillar wall F at the left of the regenerator. Each regenerator $e$ is connected by oppositely inclined ducts or passages $h$ and $h'$ to the same hairpin flue branches $d$ or $d'$ to which the regenerator E at the opposite side of the adjacent intermediate division wall $f$ are connected by its ducts H and $H'$. With the particular arrangement described, the two regenerators E and $e$ between two adjacent heating walls will thus be connected to the flue branches $d$ in one of those walls and to the flue branches $d'$ in the other of those walls.

With the regenerators located and connected to the heating flues, as described, the two regenerators E and $e$ at opposite sides of each intermediate division wall $f$ are both "off" regenerators, absorbing heat from down-flowing products of combustion, during operating periods alternating with other periods in which the two regenerators are both "on" regenerators, the regenerator E of the pair then preheating upflowing air, and the regenerator $e$ preheating upflowing air or lean gas, accordingly as rich or lean gas fuel is used in heating the battery. In the case of each two regenerators E, or $e$, at the opposite sides of a pillar wall F, however, one is necessarily an "off" regenerator, during the periods in which the other is an "on" regenerator.

Heretofore it has been the regular regenerative underfired oven practice, to supply rich fuel gas to each heating wall flue in which combustion is being initiated, through a corresponding individual vertically disposed duct in the pillar wall beneath the heating wall containing the flue. In the preferred form of the present invention, shown in Figs. 1 and 2, however, the vertical passages through which rich fuel gas is supplied to the heating wall flues, are not formed in the pillar walls F, but in the intermediate division walls $f$. Thus as shown in Figs. 1 and 2, rich fuel gas is supplied to the twin flue branches $d$ in each heating wall through a set of channels I formed in the adjacent intermediate division wall $f$ at the left of the heating wall. The channels I in each wall $f$ alternate with channels I' supplying rich fuel gas to the twin flue branches $d'$ in the heating wall immediately to the left of said wall $f$.

This requires that the upper ends of the channels I and I' be bent to the left and right, respectively, as is shown clearly in Figs. 2 and 8.

Since the two regenerators at opposite sides of each intermediate division wall $f$ are both "on" regenerators, or both "off" regenerators at any one time, and are both "on" regenerators when rich fuel gas is being supplied through the channels I and I' in said wall, there is no pressure differential tending to create any significant leakage from either regenerator into the other, and small tendency to leakage into either regenerator from the rich fuel gas supply channels I or I' in said wall, even though cracks form, or joints open in said wall. There is a pressure differential, however, which will create leakage from the "on" regenerator at the one side, to the "off" regenerator at the other side, of each wall F, if leakage paths extend through that wall. That pressure differential is at a maximum at the bottom of the regenerator sole channel level, and diminishes as the distance above that level increases, and is relatively quite small at the level of the tops of the regenerators.

The fact that each wall F includes no rich gas supply channels, tends of itself to a significant reduction in the aggregate area of the crack and joint formed leakage paths through the wall. In addition, the battery shown in Figs. 1 and 2, has a leakage barrier in the form of a metal plate or web incorporated in each of the walls F. Although leakage of air into an off regenerator is much less objectionable than leakage of fuel gas, and in some cases, the leakage barrier plate J may be incorporated only in the walls F separating the regenerators $e$ in which gas is preheated. The plate or web J is preferably formed of a refractory, corrosion resisting metal such as a nickel-chromium alloy, adapted to safely withstand the maximum temperatures to which it is subjected. As shown, each plate or web J is centrally disposed in the wall F, in which it is incorporated, and extends from below the bottom level of the sole channels to a level somewhat below the level of the tops of the regenerators, so that the plate is not subjected to the relative high temperatures prevailing in the top portion of the wall F, where the risk of objectionable leakage is relatively slight, because of the relatively small difference between the pressures at the opposite sides of the wall.

In the arrangement shown in Figs. 1 and 2, the ducts or passages I and I' in a single wall $f$, are supplied with rich fuel gas through an individual branch $K^2$ from a single corresponding distribution pipe K or K', respectively, extending crosswise of the battery and located in the basement space $a$. The pipes K and K' receive rich fuel gas alternately from a rich fuel gas supply main L extending longitudinally of the battery at one side of the latter, each of the pipes being connected to the main L through pillar walls beneath the heating walls, a reversing valve L' and a cutoff valve $L^2$. When the battery is being heated with lean gas, each of the pipes K and K' may also supply gas to the immediately adjacent gas preheating regenerator through valved branches $K^3$. Gas may then be supplied to each of said pipes K and K', through a reversing valve M' and a cutoff valve $M^2$, through which the pipe is connected to a lean gas supply main M, located at the opposite side of the battery from the main L.

The location in the same wall $f$ of channels I and I' serving two heating walls, thus gives the practical advantage that the number of distribution pipes K and K' required is only half the number of analogous horizontal distribution pipes or channels required when the rich gas supply channels are formed in the pillar walls beneath the heating walls. The fact that only as many rich gas distribution pipes K and K' are required as there are lean gas preheating regenerators, simplifies and facilitates the changeover, between operation with rich fuel gas and operation with lean fuel gas, whether rich fuel gas and lean fuel gas are distributed through the same pipes K and K' shown in Figs. 1 and 2, or are distributed through separate pipes.

Air may be supplied to each regenerator E through a distribution pipe or channel with outlets distributed along its length, like the pipe K or K' shown in Fig. 2, or like the hereinafter described masonry ducts shown in Figs. 11, 12 and other figures. Regardless of how the air distribution channel is formed or located, its ends may advantageously be open to and receive air from the atmosphere in some cases, while in other cases, the required size of the distribution channels may be desirably reduced, and other practical advantages obtained, by supplying air to said channels, as by means of the main MB shown in Fig. 11, at a pressure exceeding that of the atmosphere by a slight amount, for example, the excess pressure may correspond to 30 to 40 mm. of water. The blower supplying air to the distribution channels at such a moderate pressure need have a delivery pressure of not more than 100 mm. of water above atmospheric pressure.

In the operation of an underfired battery with rich fuel gas heating, some fuel gas decomposition and resultant deposit of carbon or graphite on the walls of the channels I and I' is to be expected. Customarily, those deposits are kept small and unobjectionable by admitting decarbonizing air to the passages during the reversal periods in which the latter are not passing rich fuel gas. Customarily, also, this decarbonizing air is supplied through the corresponding reversing valves, each of which when turned to cut off the supply of fuel gas opens a valve passage through which atmospheric air may flow into the corresponding horizontal distribution pipe and thence into the vertical passages leading to the heating flues. The reversing valve L' may be of this type, and specifically may be similar to the hereinafter described valves O shown in Figs. 5 and 6. Since there is no need to supply decarbonizing air to the fuel supply ducts when the battery is heated by the combustion of lean fuel gas, the cutoff valve $L^2$ may advantageously be located as shown between the reversing valve L' and the corresponding pipe K or K'.

The amount of decarbonizing air supplied to each of the pipes K and K', through the corresponding valve L' during operation with rich fuel gas firing, may advantageously be augmented by decarbonizing air supplied through the corresponding reversing valve M', which may be similar in construction to the valve L', and arranged for adjustment by the usual reversing gear between positions in which it respectively permits and prevents the flow and cuts off decarbonizing air, during the periods in which the corresponding valve L', respectively permits and prevents the flow of decarbonizing air. To permit such operation, each cutoff valve $M^2$ is located between the corresponding reversing valve M' and the main M.

When each of the pipes K and K' is alternatively usable to supply rich fuel gas to corresponding passages I and I', or to supply lean gas to the corresponding regenerator e, valves O are provided to close the rich fuel gas distribution branches $K^2$ when the battery is to be operated with lean gas firing, and valves OA are provided to close the lean fuel gas passages $K^3$ when the battery is to be heated with rich fuel gas. The valves O and OA may be simple cutoff valves, manually adjustable, one at a time. Advantageously, however, the operating arms O' for each set of valves O associated with each pipe K or K' are operatively connected for simultaneous adjustment, and the same arrangement is made for the operation of each set of valves OA. Advantageously, in some cases, at least, the valves O and OA are connected to the reversing valve mechanism, and the reversing valves L' and M', shown in Fig. 1, may then be omitted.

When the valves O are connected to the reversing mechanism, they preferably include decarbonizing passages, and may advantageously take the form illustrated in Figs. 5 and 6. As shown in those figures, the movable valve member $O^2$ is a tapered plug or cock formed with a through passage $O^3$ which may be turned into and out of alignment with the valve inlet and outlet passages. The passage $O^3$ is of a greater flow capacity than is required, and receives a replaceable orifice or tubular bushing member $O^4$. The effective cross section of the axial passage through the member $O^4$ may be reduced by mounting one or more wire-like obturators $O^5$ on the bottom wall of the passage. By replacing one wire by another of different diameter, or by the use of a variable number of wires or parts $O^5$, the effective flow capacity of the valve may be adjusted as required to properly regulate the flow of fuel gas through the valve. A further adjustment of the flow capacity of the valve may be effected by replacing the part $O^4$ by a part differing therefrom in the diameter of its axial passage. To facilitate the ready replacement of one part $O^4$ by another, while avoiding risk of accidental displacement, each part $O^4$ and cock passage $O^3$ are advantageously made conical.

Advantageously, and as shown, the casing of the valve O is formed with diametrically opposed openings $O^6$ and $O^7$ into register with which the passage $O^3$ is brought when the cock $O^2$ is turned to cut off the gas flow. These openings permit of the ready replacement of one part $O^4$ by another, and also permit of a very thorough and easily effected cleaning, or swabbing out, of the passage through the part $O^4$, and the ready replacement of the obturator part or parts $O^5$. The cock $O^2$ is also formed with a decarbonizing air passage $O^8$ through which atmospheric air flows to the outlet of the valve, when the cock $O^2$ is turned to cut off the supply of gas, and the inlet end of the passage $O^8$ is thereby brought into register with a decarbonizing air inlet opening $O^9$.

As previously indicated, the valves L' and M' may be precisely similar in construction to the valve shown in Figs. 5 and 6. The valves OA need include nothing corresponding to the decarbonizing air passage $O^8$ and inlet $O^9$ of the valves O, but except for their omission, the valves OA may well be exactly like the valves O.

The valve O is advantageously included in a horizontal portion of the pipe connection $K^2$ connected through a T fitting $K^4$ to a vertical section of the connection $K^2$, which extends into the lower end of the vertical masonry channel I. As shown in Fig. 7, the fitting $K^4$ includes a horizontally disposed tubular screen part $K^5$, which may be formed of wire mesh and has its inner end snugly received in the horizontal portion of the piping $K^2$ at the inlet side of the fitting $K^4$, and having its outer end extending into an opening normally closed by a removable plug $K^6$. The screen $K^5$ acts as a fire check to prevent the passage of flame back through the connection $K^2$ into the corresponding pipe K or K', and thereby prevents explosions in said pipe which might otherwise occasionally occur during the reversal operation. Furnace dust or other dirt passing down through the vertical portion $K^2$ may collect in a removable bottom part $K^7$, which may be separated from the body of the fitting $K^4$, from time to time, for cleaning purposes. Screen $K^5$ tends, of course, to screen out solid impurities in the gas passing from the corresponding pipe K or K' to the passages I or I'.

It is possible to entirely segregate the rich and lean fuel gas supply lines, while at the same time avoiding the necessity for separate horizontal distribution pipes for the different gases supplied to the rich gas channels in a wall f and to the lean gas preheating regenerator alongside that wall, by replacing each of the pipes K and K' of Figs. 1, 2, and 3, by a pipe KA, shown in Fig. 4. The pipe KA is provided with an internal longitudinal partition $K^8$, which divides the bore of the pipe into rich and lean gas passages $K^9$ and $K^{10}$, respectively.

While as previously indicated, there is no strong tendency to leakage between a rich fuel gas supply channel I or I', and the regenerators at the opposite sides of the wall $f$, in which the channel is formed, I may in some cases guard against such leakage by enclosing the hollow tiles $I^5$ surrounding and forming the wall of each passage I or I' by a tubular metal casing $I^6$, as shown in Fig. 3. The casing $I^6$, as shown, is formed by end to end tubular sections having their adjacent ends shaped to form a bell and spigot joint connection. The casing $I^6$ may extend upward from the supporting slab A to approximately the same level as the tops of the previously mentioned leakage barrier plates J, and may be formed of the same metal as the plates J.

In all coke oven batteries of the general character illustrated, it is regular and necessary practice to divide the battery brickwork into a plurality of longitudinal sections separated by vertically extending expansion joints, which take up, or close, as the brickwork expands in the initial heating up of the battery. In the special construction shown in Fig. 8, there is an expansion joint N shown as extending generally from the top of each regenerator at the right of each pillar wall F to the bottom of the coking chamber C most directly above that regenerator, between similar brick sections NA at the left and right, respectively, of the expansion joint. As shown, the expansion joint N is broken up into a plurality of vertical sections, each of which is displaced longitudinally of the battery relative to each immediately adjacent section. Each two immediately adjacent vertical sections of the expansion joint, extend, one upwardly and the other downwardly, from a horizontal joint portion N' between overlapping parts of the two sections NA at opposite sides of the joint.

The arrangement shown in Fig. 8, has the advantage that each of the channels I' and H and $h$ is located wholly within one of the masonry sections NA. Each of the other channels I, H', and $h'$, is formed partly in one and partly in the other of two adjacent brickwork sections NA. However, no one of the last mentioned channels intersects a vertical section of the expansion joint N between the two brickwork sections NA, but on the contrary, each such channel extends across a horizontal joint portion N'.

As appears from Figs. 8 and 10, the individual vertical sections of the expansion joint do not extend continuously from one side of the battery to the other. On the contrary, the joint comprises sections at different distances from the sides of the battery which extend between the same two levels and are displaced from one another in the longitudinal direction of the battery. This provides tongue and groove joints $N^5$ between each two adjacent masonry sections NA, preventing bodily movement of one section relative to the other in a horizontal direction transverse to the length of the battery. Furthermore, it permits each of the different channels I', H' and $h'$ formed partly in one and partly in another of the two adjacent sections NA, and all displaced from one another in the direction transverse to the length of the battery, to pass through a horizontal joint portion N' extending in the direction of the battery for a distance which is a fraction only of the distance which it would need to extend if it were to be traversed by all of said channels.

As shown in Fig. 8, the portion of each channel I', above the intersected joint portion N', has its lower end, width, or dimension in the direction of the length of the battery greater than the average corresponding width or dimension of the channel. In consequence, the taking up, or closing, of the expansion joint, does not cut off, or objectionably reduce, the cross section of the channel I'. The same expedient may be employed with each of the other channels comprising portions in sections NA separated by an expansion joint.

In the modified arrangement shown in Fig. 9, each of the channels I', having adjacent portions in brickwork sections NB separated by an expansion joint, has the upper one of those portions formed by the bore of a tile or hollow body $N^{10}$, which is rigidly incorporated in, and forms a part of the corresponding section NB, and has the lower one of said portions formed by the bore of a tile or hollow body $N^{11}$, like the tile $N^{10}$ and rigidly incorporated in and forming a part of the other of the two brickwork sections NB. As shown in Fig. 9, the expansion joint between the adjacent sections NB comprises vertical portions, and also comprises an inclined portion $N^{12}$ alongside the tile $N^{10}$, and between the latter and the adjacent section NB in which that tile is not imbedded. The expansion joint also comprises another inclined portion $N^{13}$ alongside the tile $N^{11}$, and between the latter and the brickwork section NB in which the tile $N^{10}$ is imbedded. As shown in Fig. 9A, the tile parts $N^{10}$ are rectangular bodies having flat sides which engage associated brick parts $N^{14}$ and $N^{15}$, in a conventional manner.

In lieu of supplying gas and combustion air through horizontal distribution pipes located beneath the deck A, as are the pipes K and K' shown in Figs. 1 and 2, I may advantageously employ horizontal distribution channels incorporated, as are the channels KB, KD and KC shown in Figs. 11 and 12, in a masonry layer AA, interposed between the battery supporting deck A and the coke oven brickwork mass, and associated regulating provisions which extend down through the deck A, into the basement space $a$. One arrangement of this sort is shown in Figs. 11, 12 and 13, and alternative arrangements, shown in other figures, are hereinafter referred to. Important advantages obtained by locating the distributing channels in the special masonry layer AA, include the advantage of a reduction in the average temperature of the deck A, and of the subway space $a$, thereby insuring less discomfort to, and more efficient operation by the battery attendants working in the basement space. The location of the distribution channels in the special masonry layer AA also insures somewhat higher distribution channel temperatures and thereby avoids the risk of the objectionable condensation, and in particular, the risk of having distributing nozzles and passages clogged by naphthalene, as they may be when the gas distribution piping is located in the subway space $a$.

In the arrangement shown in Figs. 11 and 12, KB represents a duct or channel in the masonry AA, and underlying the sole channel $e'$ of a regenerator $e$. The duct KB is connected by valves M' and $M^2$ to a lean gas supply main MA running longitudinally of the battery. A series of vertical pipes P extend centrally through the duct KB. Each of said pipes is formed with a vertically elongated slot P' in the portion of the pipe wall within the duct KB. At its upper end, each pipe P communicates with the adjacent sole channel $e'$ through a corresponding port $e^2$, into which the upper end of the pipe P extends. The lower end of each pipe P is located below the underside of the deck A, and is normally closed by a cap P². The amount of gas or air received by each pipe P from the duct KB may be regulated by a piston valve part P³ within the pipe P and of a diameter substantially equal to the internal diameter of the pipe. Each part P³ may be adjusted vertically to close more or less of the length of the corresponding slot P', by threading more or less of a supporting stem P⁴ into the part P³. The stem P⁴ normally has its lower end in engagement with, and supported by the cap P².

Air is supplied to each regenerator E through a duct KD, similar to the duct KB, and directly beneath the regenerator sole channel E, and in communication with the latter through pipes P and associated parts, like those employed to establish and regulate communication beneath the regenerator sole channel E', and in communication with the latter through pipes P and associated parts, like those employed to establish and regulate communication between the duct KB and the sole channel e'. When the ducts KB and KD are large enough in cross section, the air passing through them, may be air drawn into the ducts from the atmosphere by the battery draft suction, but with the intended operation with rich fuel gas of the arrangement shown in Figs. 11 and 12, the main MA supplies air under pressure above that of the atmosphere, to the ducts KB, and air under similar pressure is supplied to the ducts KD by a supply main MB extending longitudinally of the battery. In the arrangement shown, each duct KD is connected to the main MB through a corresponding reversing valve M' and cutoff valve M².

In the arrangement shown in Figs. 11 and 12, the channels I and I', in each regenerator division wall j may receive rich fuel gas through a duct KC, located in the masonry AA directly beneath said wall. In the arrangement shown, each duct KC is connected to a rich gas supply main LA extending longitudinally of the battery, by a reversing valve L' and cutoff valve L². In the arrangement shown, during periods in which the ducts KC are not receiving rich fuel gas from the main LA, they may receive decarbonizing air not only through the reversing valves L', but from the main MB, which is preferably located at the opposite side of the battery from the main LA, and is connected to the corresponding end of each duct KC through a corresponding branch M³ including a reversing valve M⁴. As shown, the mains MA and MB are at opposite sides of the battery, but both of those mains may well be at the same side of the battery.

Each of the ducts KB, KC and KD is advantageously formed by a metal pipe incorporated in the masonry AA, and the latter is advantageously formed of a special concrete mixture, having a relatively high content of alumina or other refractory material, adapted to withstand the temperatures, which may occasionally be as high as 400° C., to which the masonry AA is subjected, and which throughout its temperature range, will have about the same thermal expansion as the metal pipes forming the ducts KB, KC and KD. Certain precautions, desirably taken in connection with the masonry layer AA, to avoid difficulties resulting from differences in thermal expansion of said layer and associated ports of the battery structure are hereinafter described.

As shown, each of the channels I and I' receives gas from the subjacent duct KC through an individual pipe Q, which extends through the duct and has its upper end in communication with the lower end of the channel. The portion of each pipe Q below the corresponding duct KC is surrounded by a coaxial pipe QA having an internal diameter larger than the external diameter of the pipe Q. The pipe QA opens into the duct KC at the bottom of the latter and has its lower end beneath the deck A and normally closed by a removable cap QA'. With the cap QA' removed, the amount of gas passing from the duct KC into and through the corresponding pipe Q may be regulated, by the adjustment of suitable flow regulating means. As shown, each of the ducts KB, KC and KD is formed by a metal pipe embedded in the masonry AA, and to which the transverse pipes P, Q and QA are welded, or otherwise secured.

As shown clearly in Fig. 13, the flow capacity of each pipe Q is regulated primarily by the size of the central orifice Q² in an orifice member Q'. The latter is screwed or otherwise removably secured, in the lower end of the pipe Q, so that the effective flow capacity of the pipe Q may be varied by replacing an orifice member Q' having an orifice Q² of one diameter, by another orifice member Q' having an orifice Q² of different diameter. The flow capacity of each orifice Q² can also be regulated by extending one or another of a set of rods or wires Q³ of different diameters, through said orifice. As shown, the rod or wire Q³ in use, rests on and is supported by a plug QA² removably received in an axial opening in the end wall of the corresponding cap QA'. Each plug QA², as shown, is formed with a cavity receiving and centering the lower end of the rod or wire Q³. With the rod or wire so supported and centered, it will tilt into engagement with the wall of the passage Q² as shown in Fig. 13, so that any one rod Q³ will always have the same flow restricting effect on an orifice Q² of given diameter.

As shown in Fig. 13, each orifice member or nozzle part Q' is formed at its upper side with a seat for the lower end of a tubular screen QA³, coaxial with, and of an external diameter appreciably less than the internal diameter of the pipe Q. The screen QA³ has an impervious upper end part Q⁴. The screen QA³ serves as a fire check preventing the small explosions which may otherwise occur occasionally at the ends of reversal periods. The screen QA³ also assists in preventing the orifice Q² from being clogged by furnace dust dropping down from the furnace Q. In the arrangement shown in Fig. 13, such dust will accumulate on the portion of the top surface of the nozzle member Q', surrounding the screen QA³, and can be removed from time to time by removing the nozzle member.

Fig. 13ᵃ illustrates a modification of the arrangement shown in Fig. 13, in which the screen QA³ is not used, but in lieu thereof, a barrier Q⁵ of inverted conical form is axially disposed in the bore of the pipe Q, a short distance above the top of the nozzle member Q'. As shown, the barrier or baffle part Q⁵ is a metal part carried by a rod Q⁶, and having a conical flow deflecting under portion. The rod Q⁶ is secured at its lower end to the corresponding nozzle member Q'. The barrier Q⁵ arrests downfalling carbon, or other furnace dust particles or diverts them radially outward, so that, for the most part, they cannot enter the orifice Q² of the subjacent nozzle member Q'. To minimize dust deposits on the portion of the nozzle part Q' at the margin of the upper end of the orifice Q², the upper tubular bars of the nozzle member is bevelled off as indicated at $Q^7$.

With any of the arrangements described herein, it is possible to tightly close the lower end of the rich gas outlet pipes Q, as may be desirable, during extended periods of operation with lean fuel gas. To this end, in Fig. 13, the threaded connection between the pipe QA and cap member QA' is sufficiently elongated to permit the bottom wall of the cap member to be brought into snug engagement with the orifice member Q', thereby closing its orifice $Q^2$. In Fig. 13$^a$, a special valve member $Q^9$ is mounted in the cap member QA', with freedom for adjustment as required to permit the valve member to be brought into sung engagement with the bottom of the orifice member Q' at all points around its orifice $Q^2$, when the cap QA' is screwed up on the pipe QA.

In lieu of regulating the outflow through the branch pipes P and Q in the ways previously described, the lower end of each of those pipes may be in free communication with the corresponding distribution pipe KC, KB or KA, and may have its flow capacity determined by an obturator removably received in the pipe. By replacing one such obturator by another of different cross sectional area, the pipe may be variably throttled. One arrangement of the type just described is shown in Fig. 13$^b$, wherein the pipe Q has its lower end welded in an orifice in the top wall of the pipe KC, and the obturator is a spherical part $P^5$ held within the pipe Q by the upper end of a rod $P^4$ which has its lower end seated on the removable closure QA' for the pipe QA in register with the pipe Q. To accurately center the part $P^5$ in the tube Q, the rob $P^4$ is provided with centering fins or ribs $P^6$ extending radially away from the rod.

To permit of a highly accurate regulation of the flow capacity of the pipe including the obturator $P^5$ more important in the regulation of the rich fuel gas supply than in the regulation of lean gas or air to be regenerated, the pipe wall surrounding the obturator may be accurately machined or, as shown in Fig. 13$^b$, may be formed by a tubular part $Q^{10}$ having an accurately formed bore and mounted in the portion of the pipe surrounding the obturator. In the particular arrangement shown in Fig. 13$^b$, the part $Q^{10}$ is secured as by a driving fit in the lower end of an uprising extension $Q^{11}$ of the pipe $Q^{10}$. When each part $P^5$ is permanently secured to its supporting rod $P^4$, the latter, as well as the part $P^5$ must be replaced to vary the flow capacity of the corresponding pipe Q or P. Alternatively, however, the obturator parts $P^5$ may be separable from the supporting rods $P^4$, so that each rod $P^4$ may be used to interchangeably support the parts $P^5$ of different size. While in general, the obturator part should be symmetrical about the axis of the pipe in which it is placed, it need not be spherical, as shown in Fig. 13$^b$, but may be cylindrical with conical ends as is the part $P^7$ shown in Fig. 13$^c$, or may have some such streamline form as the obturator part $P^8$ shown in Fig. 17.

In Fig. 13$^d$, a nozzle member QB is screwed into a threaded portion PB' of a vertical branch supply pipe PB, above the corresponding horizontal distribution pipe KB. The member QB differs from the nozzle member Q' in being formed with a kerf $Q^{15}$ at its underside so that it may be readily put in place and removed by a screw driver like implement QQ, which may be inserted in the pipe PB from the basement space, and comprises tenon and blade portions $Q^{16}$ and $Q^{12}$ and adapted to respectively enter the orifice $Q^2$ and kerf $Q^{15}$, respectively, of the member QB. The pipes KB and PB of Fig. 13$^d$, are shaped and connected as shown in Fig. 17 and hereinafter described.

To facilitate the relative expansion of the coke oven brickwork, the layer AA, and the deck layers $AA^3$ of tar, tar paper, or the like, may be interposed, as shown in Fig. 17, in the joints between the masonry AA, and the coke oven brickwork and deck A as shown in Fig. 17. As appreciable expansion of the masonry AA relative to the deck A is to be expected, holes larger in diameter than the pipes P and QA, and the annular space between each of those pipes and the walls of the opening in the deck through which the pipe extends may be filled initially with some readily yielding material, which may be replaced by concrete $P^{10}$, after the battery has been initially heated up to its working temperatures.

The composition of the masonry layer AA, may well be made such that the masonry and the metal distribution pipes incorporated in the masonry will have little or no significant relative expansion as the battery is heated up. To avoid trouble due to such small relative expansion as may occur, the pipes may be thickly coated with tar, tar paper, or the like. In general, such relative expansion as may occur will result from expansion of the metal pipes relative to masonry as their temperatures increase, and will diminish in magnitude from each side of the battery toward its center. To avoid risk of possible fracture of the welded joints between the distribution pipes KC, KD, etc., and the vertical connection pipes Q, P, etc., connected to the distribution pipes, each horizontal distribution pipe may have welded to it one or more external fins or circumferential ribs $KC^{10}$, adjacent each of its ends as shown in Fig. 11, so that expansion of the pipe relative to the masonry AA will tend to open cracks in the latter, and thus avoid injury to the joints between the metal distribution pipes and the vertical pipes welded thereto. In lieu of, or in addition to the fins $KC^{10}$, each horizontal distribution pipe may include an expansion joint $KC^{11}$ between each side of the battery and its center, and nearer the side than the center. As shown in Fig. 11, each expansion joint $KC^{11}$ comprises a radial enlargement of the pipe, which, in practice, may be formed in a known manner, by welding an expansion joint section of plate metal between end to end portions of the corresponding distribution pipe.

Advantageously, and as shown, the masonry AA is divided into sections by vertical expansion joints AA' extending transversely of the battery. To prevent or minimize the formation and opening of cracks in the masonry AA, particularly as a result of the expansion of the coke oven brickwork relative to that of the masonry AA, the latter may well be reinforced adjacent its upper side by horizontal tierods $AA^2$, extending from one side of the battery to the other.

Figs. 14, 15 and 16 illustrate a construction including ducts KB, KC and KD and associated pipes P, Q, and QA, like those shown in Figs. 11 and 12, and also including provisions for passing the air or lean gas supplied through each pipe P, directly to a corresponding regenerator section or compartment into which each regenerator chamber E or e is divided by transverse partitions $E^{10}$. Each regenerator chamber is thus divided into as many compartments as there are double or twin flues in either adjacent heating wall. Each such regenerator compartment is connected at its upper end by a single duct H or $h$, and by a single duct H' or $h'$ to a single heating flue in each of the two adjacent heating walls.

Each regenerator partition wall $E^{10}$ may be formed of specially shaped bricks, or of blocks loosely stacked one on top of another, or advantageously, in some cases, as shown in Fig. 14, the portion of said wall between the regenerator brick top and bottom levels may be the end walls of specially shaped checkerbrick blocks $E^{11}$, which, like the other checkerbrick blocks $E^{12}$, may be of the general type and form disclosed in my prior Patent 2,018,223. For the purposes of the present invention, it is not essential that the joints between the bricks or blocks forming each wall $E^{10}$ and between the edges of that wall and the adjacent wall of the regenerator chamber, should be entirely gas tight, and as shown in Fig. 14, inspection ports $E^{13}$ are formed in the blocks $E^{14}$ forming the upper portions of the walls $E^{10}$, the ports $E^{13}$ being in line with a normally closed inspection opening $E^{15}$ in the regenerator end walls.

As shown in Figs. 14 and 15, the checkerbrick blocks $E^{11}$ and $E^{12}$ are supported by refractory tray-like bodies $E^{16}$. Each part $E^{16}$ extends horizontally for the full width of the regenerator chamber and is formed with a multiplicity of relatively large ports $E^{17}$, provided for flow between the corresponding regenerator compartment and subjacent sole channel E' or e', and has its side edges resting on brickwork shoulders $E^{18}$ projecting from the side walls of the regenerator chamber. Each part $E^{16}$ has a central aperture $E^{19}$ in register with the subjacent pipe P, and in communication with the latter through a conduit or passage $E^{20}$, extending across the corresponding sole channel E' or e' to the lower side of the masonry layer AA. As shown the lower ends of the passages $E^{20}$ receiving the upper ends of the pipes P are enlarged to accommodate the relative expansion of the layer AA and deck A. As shown, the passages $E^{20}$ are formed in masonry walls bisecting the sole channels E' and e'.

In Figs. 15 and 16, metal plate sections JA are incorporated in the lower portions of the regenerator division walls $f$. Each plate JA, as shown, has one edge bent into the form of a half cylinder JA' and has its other vertical edge bent to form a half cylinder $JA^2$. The adjacent half cylinders JA' and $JA^2$ of the plate sections JA at opposite sides of each rich fuel gas supply channel I' or i' unite to form a cylindrical casing surrounding the usual tubular ceramic material parts $I^5$ which form the walls of said channels. The plate sections JA of Figs. 15 and 16 thus serve the same general leakage preventing functions of the plates J shown in Figs. 1 and 2, and of the casing parts $I^6$ shown in Fig. 3. They may be formed of the same material, and extend up to the same level as the plates J.

To distribute the combustible agent, lean gas or air, discharged into regenerator spaces by the corresponding pipes P through portions of those spaces, flow dividing and distributing devices are advantageously provided at the upper ends of the passages $E^{20}$. As shown in Fig. 14, the flow distributing part at the upper end of each passage $E^{20}$, is a metallic part $P^5$ carried by a depending rod part $P^6$ which may be an extension of the rod or stem $P^4$ provided for the vertical adjustment of the corresponding flow regulating device $P^3$. In such case, the part $P^5$ can be inserted in and removed from the passage $E^{20}$. In lieu of metallic parts $P^5$ supported as described, I may mount refractory material parts $E^{22}$ on the tray parts $E^{16}$ above the central apertures $E^{19}$ in the latter, as shown in Fig. 15.

To control and regulate the down flow distribution through the different regenerator compartments, I may employ parts R beneath the tray parts $E^{16}$, and formed with suitably proportioned ports R' through which waste heating gases pass downward into the corresponding sole channel E' or e'. As shown, the parts R, which may be formed of steel, cast iron or ceramic material, are received in grooves extending longitudinally of each sole channel and formed in the side walls of the sole channels and in the bisecting wall $E^{21}$. By removing closure parts $R^2$ and $R^3$ at the ends of the sole channel, the parts R are made accessible for replacement, by parts similar except for the cross sectional areas of the different ports R'. The described arrangement thus permits of such regulation as may be desirable of the port areas through which the different compartments of each regenerator communicate with the regenerator sole channel.

The distribution of the combustible agent, lean gas or air, to be preheated in the different compartments into which each regenerator of the arrangement shown in Figs. 14 and 15 is divided, may be adversely affected theoretically, because of flow from one regenerator compartment into another through the sole channel, to which all of said compartments are open at their lower ends. In most cases, the difference between the pressures in the lower ends of the different compartments will be so relatively small, and the resistance offered by the screen parts $E^{16}$ and R, to flow from one regenerator compartment into another through the sole channel will be so relatively large, that such flow as may occur, will be too small to be practically objectionable. I have devised means, however, by which such flow may be positively prevented when such prevention seems desirable.

One arrangement for the purpose devised by me is shown in Figs. 17 and 18, wherein the tray and screen parts $E^{16}$ and R shown in Figs. 14 and 15, are replaced by tray parts $E^{30}$ having thickened bottom walls in each of which are formed one or more longitudinally extending passages. As shown, two such passages are formed in each tray part $E^{30}$. The passages $E^{31}$ in the trays $E^{30}$ at the bottom of each regenerator, are shown as collectively forming two cylindrical valve chambers extending horizontally from one side of the battery to the other. As shown in Figs. 17 and 18, each chamber $E^{31}$ receives a corresponding valve member S, of the piston valve type, comprising a plurality of cylindrical sections arranged end to end, and each formed with circumferentially extending grooves S'. The valves S may be made of any suitable material as cast iron or ceramic material.

The valve grooves S' are so distributed with respect to vertical ports $E^{32}$ formed in the trays $E^{30}$, and intersecting the passages $E^{31}$, that when the valve S is longitudinally adjusted into the position shown in Fig. 18, the flow through the corresponding ports $E^{32}$ from the regenerator compartments above them, to the sole channel beneath them, is cut off. When the valve S is given a small longitudinal adjustment to the left from its position seen in Fig. 18, the ports $E^{32}$ will be opened for the passage of waste gases from the regenerator compartments into the subjacent sole channel. By replacing the valves S, or sections thereof, associated with each regenerator, by valves or sections of slightly different configuration, the relative flows through the different ports $E^{32}$ of each regenerator may be varied as required for regulation purposes.

The valve S may be longitudinally adjusted by suitable connections to the battery reversing mechanism. To this end, in the arrangement shown in Fig. 18, each end of each valve is engaged by a plunger $S^2$ slidingly received in a bushing $S^3$ providing a closure for a passage formed in the corresponding regenerator end wall. As shown, each closure part $S^3$ has stuffing box provisions for preventing leakage out of the valve passage along the corresponding plunger $S^2$. Each plunger $S^2$ is given an inward thrust at the proper time to thereby effect a corresponding longitudinal adjustment of the valve S, by a corresponding rocking element mounted on a pivotal support $S^4$ and including an arm $S^5$ carrying a roller engaging the external head of the plunger $S^2$. Each such rocking element includes an arm $S^6$, connected by a link $S^7$ to the battery reversing mechanism. As shown in Fig. 18, each valve member S is adjusted from its closed into its open position by an inward thrust given the corresponding right hand plunger $S^2$, and is given an opening adjustment by an inward thrust given the left hand plunger $S^2$.

As shown in Figs. 17 and 18, each valve channel $E^{31}$ is lined by a metal pipe or sleeve SA, having wall ports in register with the ports $E^{32}$, and which may well be replaceable on the development of objectionable wear.

In the modified arrangement shown in Figs. 19 and 20, the solid piston valve S of Figs. 17 and 18 is replaced by a valve SB in the form of a metal pipe or tube. The valve SB is formed with ports $S^{10}$ in its wall which are moved by a suitable bodily adjustment of the valve SB into and out of register with the ports $E^{32}$, or, as shown, into and out of register with the wall ports in a valve chamber lining tube or sleeve SA. That adjustment might be a longitudinal adjustment effected by the means shown in Fig. 18, but as shown in Fig. 20, it is an angular adjustment. The means shown for effecting the angular adjustment of the valve SB comprises a trunnion like shaft portion $S^{11}$ of the valve, which extends through the member $S^3$ at one side of the battery, and has its external end connected to one end of a rocker arm $S^{12}$. The latter has its other end connected to a reversing valve mechanism element $S^{13}$, extending longitudinally of the battery and given periodical to and fro longitudinal adjustments.

As will be understood, the special valves S and SB shown in Figs. 17–20 as interposed between the regenerators and their sole channels, do not displace, but are in addition to the usual waste gas reversing valves G. In consequence of the fact that the valves G are in series, so to speak, with the valves S and SB, it is not necessary to make the latter valves actually gas tight, as such leakage past those valves, as may occur, will not be practically important.

In Figs. 17 and 18, I have illustrated an arrangement for passing the combustible agent to be regenerated into each regenerator through vertical passages $F^5$ formed in the adjacent pillar wall F and opening laterally at their upper ends to the regenerator, at a level above its sole channel. As shown, in Figs. 17 and 18, each channel $F^5$ opens into a corresponding regenerator compartment through a horizontally elongated port $E^{33}$ formed in the uprising marginal flange portion of the corresponding tray $E^{30}$. As shown in Figs. 17 and 18, each vertical channel $F^5$ receives lean gas or air at its lower end from the corresponding horizontal pipe KB or KD through a vertical branch pipe PB having its upper end extended into the channel $F^5$.

In the arrangement shown in Figs. 17 and 18, each of the pipes PB, and QB differs from the corresponding pipe P or QA, respectively, of Figs. 11, 12, 14 and 15, in that it does not extend through the corresponding horizontal pipe KB, KD or KC, but has its axis laterally displaced from the axis of the horizontal pipe, and in that it is formed with an aperture in its side in register with an aperture in the wall of the horizontal pipe. This arrangement has the advantage that the vertical pipes PB and QB do not interfere with the cleaning of the corresponding horizontal pipes KB, KD or KC. With the arrangement shown, a cleaning implement of the full cross section of the pipe KB and KD can be moved through the latter when their ends are opened for the cleaning operation. With the particular proportions shown in Fig. 17, each of the pipes Q extends into the corresponding pipe KC for a short distance, but not far enough to interfere significantly with the cleaning of the last mentioned pipe.

The desirable arrangements of the channels $F^5$ and ports $E^{33}$ shown in Figs. 17 and 18, and of the piping shown in those figures and described in the previous paragraph, are not restricted to use in conjunction with valves like the valves S and SB, but may be used, for example, in a construction in which those valves are omitted, and in which ported members R are used, as shown in Figs. 21 and 23.

Some features of the present invention are adapted for advantageous use in a coke oven battery in which the rich fuel gas distributing channels are located in the regenerator division walls directly beneath the oven heating walls instead of being formed in the intermediate regenerator division walls, as in the constructions previously described. Thus as shown in Figs. 21 and 22, the main regenerator division wall F is formed with vertical rich fuel gas supply channels I and I' which alternate with one another along the length of the wall, and are adapted to supply fuel gas at alternate periods to the respective branches of the twin flues in the heating wall directly above the wall F, as has been customary heretofore. Each of the channels I in a single wall F is adapted to receive gas from a corresponding pipe Q associated with a surrounding pipe QB and with a horizontal gas supply pipe KC in the masonry layer AA, as in the construction shown in Fig. 16. Similarly, each channel I' in the wall F receives gas through a pipe Q associated with a corresponding pipe QA and a second horizontal pipe KC, imbedded in the masonry AA.

In lieu of a one-piece metal leakage barrier J in the wall F like that of the construction first described, the construction shown in Figs. 21 and 22 includes a barrier wall formed by plate sections JB, alternating with sections JB', each of the sections being similar to the sections JA shown in Fig. 16 except in respect to the angular extent of their curved edge portions. As shown in Fig. 22, the channels I are all at the right hand side, and the channels I' are all at the left hand side of the central vertical plane of the wall F, and the body portions of the sections JB and JB' extend along that plane. The tubular tile parts $I^5$ forming the wall of each of the channels I and I' are partially surrounded by a curved edge portion $JB^2$ of the adjacent section JB, which extend about the axis of the channel for appreciably more than 180°, and a cylindrical casing around the channel is completed by a curved edge portion $JB^3$ of the adjacent plate JB' which extends about the axis of the channel for less than 180°.

In the arrangement shown in Fig. 21, air is supplied to the regenerators E, through horizontal pipes KB and vertical pipes PB, associated therewith, as in the arrangement shown in Fig. 17. Similarly, each regenerator e receives lean gas or air through a horizontal pipe KD and vertical pipes PB, associated therewith, as shown in Fig. 17. Each of the pipes PB includes an obturator $P^8$ of streamlined form. As shown in Fig. 21, a metallic barrier or leakage preventing wall JC is centrally disposed in the intermediate regenerator wall $f$, just as the barrier J is included in the wall F of the construction first described. The arrangement shown in Fig. 21 includes ported tray parts $E^{16}$, and waste gas distribution plates R, like those shown in Figs. 14 and 15, except that the tray parts $E^{16}$ of Fig. 21, are formed with lateral ports $E^{33}$ through which the channels $F^5$ open laterally into the corresponding regenerator compartments, as in the construction shown in Figs. 17 and 18.

Figs. 23 and 24 illustrate a modification of the arrangement shown in Figs. 21 and 22, in which the channels I and I' are displaced to the opposite sides of the central plane of the wall F in which they are formed, far enough to permit the use of a straight barrier plate J, centrally disposed in the wall, as in the construction first described, and passing between the tiles $I^5$ forming the walls of the channels I, and the tiles $I^5$ forming the walls of the channels I'. With the arrangement shown in Figs. 23 and 24, the plane of the axes of the channels I in each wall F are displaced far enough from the plane including the axes of the channels I' in the same wall, so that the two corresponding rich fuel gas supply pipes KC can be arranged side by side, and may deliver gas to the channels I and I', through pipes Q and QA associated with the pipes KC, as shown in Figs. 11 and 15.

Although the general features of my improvements minimizing the leakage risk in coke oven batteries having hairpin flues with but two side by side regenerators between adjacent pillar walls, may be utilized as shown in Figs. 1, 2, and 3, without a corresponding use of the general features of my improvements, in the supplying to the regenerators the combustible agents preheated therein, the conjoint use of those general features is advantageous. For example, the proper distribution of the combustible agents preheated in the regenerators along the bottom edges of those regenerators, tends to prevent differences between the pressures in different portions of a single regenerator, and thus minimize pressure differentials creating leakage through regenerator division walls. Furthermore, the use of two regenerators, instead of three, between each two adjacent pillar walls, facilitates the inclusion of horizontal distribution channels in the coke oven masonry mass, by increasing the space measured in the longitudinal direction of the battery, for each such channel.

With the rich gas distribution channels I and I' incorporated in the intermediate walls $f$ instead of in the pillar walls F, particularly if the latter include leakage barriers J, it is practically feasible to make the walls $f$ as thick as the pillar walls F, and still provide adequate space for the two regenerators E and e between each two adjacent pillar walls F. The equalization in thickness of the walls F and $f$, eliminates differences in the vertical thermal expansion of those walls due to differences in their thickness and permits the intermediate walls $f$ to carry a corresponding portion of the weight of the portion of the battery above the regenerators, and compensates for any weakening of the walls $f$ or leakage tendency due to the inclusion of the channels I and I' in those walls.

No claim is made herein on the provisions disclosed for distributing combustible agents to the regenerators and heating wall flues through horizontal distribution pipes embedded in the coke oven masonry structure above the basement space of an underfired coke oven battery, as said provisions are claimed in my application, Ser. No. 351,836, filed August 8, 1940, as a division hereof.

While in accordance with the provisions of the statutes, I have illustrated and described the best forms of my invention now known to me, it will be apparent to those skilled in the art that changes may be made in the form of the apparatus disclosed herein without departing from the spirit of my invention as set forth in the appended claims, and that some features of my invention may advantageously be used in some cases, without a corresponding use of other features.

Having now described my invention, what I claim as new and desire to secure by Letters Patent, is:

1. An underfired coke oven battery, comprising in combination, side by side horizontally elongated coking chambers, heating walls alternating with said coking chambers and having hairpin flues, a supporting wall beneath each heating wall, an intermediate wall between each two adjacent supporting walls, a regenerator between each intermediate wall and each adjacent supporting wall, ducts connecting the two regenerators between each two adjacent supporting walls to one branch of each twin flue in each of the two heating walls above the last mentioned supporting walls, and means for supplying rich fuel gas to said flues comprising upwardly extending supply passages in each of said intermediate walls.

2. An underfired coke oven battery comprising in combination, side by side horizontally elongated coking chambers, heating walls alternating with said coking chambers and having hairpin flues, a supporting wall beneath each heating wall, an air preheating regenerator and a gas preheating regenerator arranged side by side between each two adjacent supporting walls, ducts connecting the two regenerators between each two adjacent supporting walls to one branch of each hairpin flue in each of the adjacent heating walls, each gas preheating regenerator being separated by the immediately adjacent supporting wall from another gas preheating regenerator, and a metal plate leakage barrier incorporated in each of said supporting walls separating the gas preheating regenerators.

3. An underfired coke oven battery, comprising in combination, side by side horizontally elongated coking chambers, heating walls alternating with said coking chambers and having hairpin flues, a supporting wall beneath each heating wall, an air preheating regenerator and a second regenerator arranged side by side between each two adjacent supporting walls, said second regenerator being adapted for optional use in preheating air or lean fuel gas, an intermediate regenerator division wall separating the two regenerators between each two supporting walls, ducts connecting the two regenerators between each two adjacent supporting walls to one branch of each twin flue in each of the adjacent heating walls, each of said intermediate walls being formed with two sets of uprising rich gas supply channels, the channels of one set being connected to one hairpin flue in one, and the channels of the other set being connected to the hairpin flues in the second of the two adjacent heating walls, and a metal plate leakage barrier incorporated in each of said supporting walls.

4. In an underfired coke oven battery, the combination with a horizontally elongated heating wall having hairpin flues, of a supporting wall directly beneath said heating wall, two cooperating gas preheating regenerators immediately adjacent and at opposite sides of said supporting wall, and each connected to the other through the hairpin flues in said heating wall, and a metallic plate leakage barrier incorporated in said supporting wall and extending longitudinally thereof for a substantial portion of the height of the wall.

5. An underfired coke oven battery comprising in combination, side by side horizontally elongated coking chambers, heating walls alternating with said coking chambers and formed with hairpin flues, a supporting wall beneath each heating wall, an intermediate wall between each two adjacent supporting walls, a regenerator chamber at each side of each intermediate wall and between the latter and each adjacent supporting wall, ducts connecting the two regenerators between each two adjacent supporting walls to one branch of each twin flue in each of the two heating walls above the last mentioned supporting wall, and means for supplying rich fuel gas to said flues, comprising upwardly extending supply passages in each of said intermediate walls, each such channel having an upper inclined portion extending into communication with a hairpin flue in an adjacent heating wall.

6. In an underfired coke oven battery, the combination with side by side horizontally elongated coking chambers and heating walls alternating with said chambers and formed with hairpin flues, of a supporting wall beneath each heating wall, an intermediate wall between each two adjacent supporting walls, a regenerator between each intermediate wall and each adjacent supporting wall, means associated with the two regenerators at opposite sides of each intermediate wall, for the optional simultaneous preheating of combustion air in the two regenerators, or for the simultaneous preheating of combustion air in one, and of lean fuel gas in the other of the two regenerators, ducts connecting the different regenerators to the flues in adjacent heating walls, and means for supplying rich fuel gas to said flues comprising upwardly extending supply passages in said intermediate walls.

7. In an underfired coke oven battery, the combination with side by side horizontally elongated coking chambers and heating walls alternating with said coking chambers and having hairpin flues, of a supporting wall beneath each heating wall, an air preheating regenerator and a second regenerator arranged side by side between each two adjacent supporting walls, said second regenerator being adapted for optional use in preheating air or lean fuel gas, ducts connecting the two regenerators between each two adjacent supporting walls to one branch of each twin flue in each of the adjacent heating walls, each of said supporting walls being formed with two sets of uprising rich gas supply channels, each channel of one set being connected to one branch of a corresponding hairpin flue in the superposed heating wall and each channel of the second set being connected to the second branch of a corresponding hairpin flue in the superposed wall, and a metal plate leakage barrier incorporated in each of said supporting walls and comprising portions interposed between adjacent channels of the different sets of channels formed in said wall.

8. An underfired coke oven battery combination as specified in claim 1 in which upwardly extending supply passages in each intermediate wall have inclined upper end extensions respectively communicating with the different flues in one of the two adjacent heating walls and other upwardly extending passages in said wall and alternating with the first mentioned passages have inclined upper end extensions respectively communicating with the different flues in the second of the two adjacent heating walls.

9. An underfired coke oven battery as specified in claim 1, having expansion joints distributed along the length of the battery, and each extending between the bottom of a coking chamber and the top of a subjacent regenerator, and comprising alternating horizontal and vertical sections, and in which each of the upwardly extending supply passages in an adjacent intermediate wall which supply rich fuel gas to the flues in one of the adjacent heating walls, intersects a horizontal section of said expansion joint.

10. An underfired coke oven battery as specified in claim 1, having expansion joints distributed along the length of the battery, and each extending between the bottom of a coking chamber and the top of a subjacent regenerator, and comprising alternating horizontal and vertical sections, and in which each of the upwardly extending supply passages in an adjacent intermediate wall which supply rich fuel gas to the flues in one of the adjacent heating walls, intersects a horizontal section of said expansion joint, and in which each of said passages is enlarged adjacent the said horizontal section intersected by the passage.

11. An underfired coke oven battery as specified in claim 5, having expansion joints distributed along the length of the battery and each extending between the bottom of a coking chamber and the top of a subjacent regenerator and being intercepted by the inclined upper portions of passages supplying rich fuel gas to an adjacent heating wall, and in which each inclined passage portion is formed by the bores of end to end hollow tiles of rectangular cross sectional outline, and in which the tiles surrounding each inclined passage portion comprise one or more tiles anchored in one, and one or more tiles anchored in the other of the two sections of the battery separated by the expansion intercepted by said passage portion.

12. An underfired coke oven battery as specified in claim 1, in which a horizontal distribution channel adjacent the lower edge of each of said intermediate walls is connected to the different supply passages in said wall by separate valved connections, and comprising means including a reversing valve for supplying rich fuel gas to said channel at one end during certain periods, and for supplying decarbonizing air to the channel at each end during alternating periods.

13. An underfired coke oven battery as specified in claim 1, in which a horizontal distribution channel adjacent the lower edge of each intermediate wall is connected to the different supply passages in said wall by separate valved connections, and is connected by other valved connections to a gas preheating regenerator at points distributed along the length of the regenerator, and in which means are provided for optionally supplying either rich or lean fuel gas to said channel.

14. An underfired coke oven battery as specified in claim 1, in which a horizontal distribution channel adjacent the lower edge of each intermediate wall is connected to the different supply passages in said wall by separate valved connections, and in which said channel is connected by other valved connections to a gas preheating regenerator at points distributed along the length of the regenerator, and which comprises means including reversing valves for supplying rich fuel gas to said pipe at one end and during certain periods, and for supplying decarbonizing air to the pipe at each end during alternating periods alternating with the first mentioned period.

15. An underfired coke oven comprising a masonry mass above a basement space and formed in its lower portion with regenerators extending transversely of the battery and with sole channels beneath the different regenerators and with a guideway extending longitudinally of each regenerator adjacent its bottom and plate-like members received in said guideway and formed with ports through which said regenerator communicates with the subjacent sole channel and means independent of said ports for supplying fluid to said regenerator to be preheated therein.

16. An underfired coke oven battery comprising a masonry mass above a basement space and formed with transverse regenerator chambers in its lower portions and with a sole channel beneath each regenerator, of valve means adjustable to establish and close communication between each regenerator and the subjacent sole channel, at points distributed along the length of the regenerator and means including ports opening to the regenerator above said valve means for supplying fluid to the regenerator to be preheated therein.

17. An underfired coke oven battery as specified in claim 1, comprising a sole channel beneath each regenerator for the outflow of waste heat gases therefrom, and means for supplying a combustible agent to be preheated to each regenerator at points distributed along the length of the regenerator, comprising a multiplicity of vertical channels in the lower portion of the supporting wall adjacent the regenerator, and each terminating at its upper end in a port opening horizontally into the lower portion of the regenerator.

18. An underfired coke oven battery as specified in claim 1, comprising a sole channel beneath each regenerator for the outflow of waste gases therefrom, a ported wall between each regenerator and sole channel, partitions within the regenerator dividing the latter into a horizontal row of vertical sections and means for supplying a combustible agent to be preheated to each regenerator comprising vertical passages formed in the supporting wall alongside the regenerator and each terminating at its upper end in a port elongated in the direction of the regenerator and opening horizontally to the corresponding regenerator section above said ported wall.

19. An underfired regenerative coke oven battery comprising in combination a reinforced concrete supporting deck above a basement space, a brickwork mass above said deck including coking chambers, alternating with flued heating walls extending transversely of the battery, a supporting wall beneath and parallel to each heating wall, two regenerators, and an intermediate wall between each two adjacent supporting walls, upwardly extending rich fuel gas supply channels in each intermediate wall for supplying rich fuel gas to the heating flues in the two adjacent heating walls, a regenerator sole channel beneath each regenerator, and means for supplying a combustible agent to be preheated to each regenerator comprising vertically disposed passages formed in the lower portion of the adjacent supporting wall connected at their upper ends to said regenerator.

20. An underfired regenerative coke oven battery comprising in combination a reinforced concrete supporting deck above a basement space, a brickwork mass above said deck including coking chambers, alternating with flued heating walls extending transversely of the battery, a supporting wall beneath and parallel to each heating wall, two regenerators, and an intermediate wall between each two adjacent supporting walls, upwardly extending rich fuel gas supply channels in each intermediate wall for supplying rich fuel gas to the heating flues in the two adjacent heating walls, a regenerator sole channel beneath each regenerator, means for supplying a combustible agent to be preheated to each regenerator comprising vertically disposed passages formed in the lower portion of the adjacent supporting wall connected at their upper ends to said regenerator, and a metal plate leakage barrier incorporated in the lower portion of each supporting wall between the supply passages for the two regenerators at opposite sides of the wall.

21. An underfired coke oven battery as specified in claim 1, in which each rich fuel gas supply channel is formed by the bores of superposed hollow tiles incorporated in a regenerator division wall, and in which said tiles are encased by metal.

22. A coke oven battery as specified in claim 1, in which the intermediate walls are substantially as thick as the walls beneath the pillar walls.

23. In a regenerative coke oven battery comprising coking chambers alternating with heating walls, regenerators and masonry regenerator division walls beneath said chambers and heating walls, some of said regenerator division walls being interposed between regenerators serving simultaneously as on and off regenerators respectively, and vertical metallic leakage barrier plates incorporated in the last mentioned division walls.

24. An underfired coke oven as specified in claim 15 in which the said platelike members are removably received in said guideway.

25. An underfired regenerative coke oven battery comprising in combination a brickwork mass including coking chambers and chamber heating means comprising flued heating walls, regenerators, regenerator sole channels and upwardly extending combustion air, rich fuel gas and lean fuel gas supply passages with their inlets at the bottom of said mass and arranged in rows extending transversely of the battery, horizontal metallic distribution pipes beneath said mass and each adjacent and connected to the inlets in a corresponding one of said rows, and a reinforced concrete structure supporting said brickwork mass and forming a ceiling above a basement space underlying said mass, and comprising a reinforced layer of concrete directly beneath said mass in which said distribution pipes are embedded and having about the same coefficient of thermal expansion as said pipes, throughout the temperature range to which said pipes and layer are exposed.

CARL OTTO.